US005719929A

United States Patent [19]

Menard

[11] Patent Number: 5,719,929

[45] Date of Patent: Feb. 17, 1998

[54] GENERALIZING SPECIALIZED TELEPHONE NUMBERS

[75] Inventor: John Peter Menard, Naperville, Ill.

[73] Assignee: Lucent Technologies Inc., Murray Hill, N.J.

[21] Appl. No.: 579,894

[22] Filed: Dec. 28, 1995

[51] Int. Cl.$^6$ .................... H04M 3/42

[52] U.S. Cl. .................... 379/216; 379/355; 379/40; 379/45

[58] Field of Search .................... 379/216, 355, 379/289, 40, 45, 51, 93, 201

[56] References Cited

U.S. PATENT DOCUMENTS

| | | | |
|---|---|---|---|
| 5,018,191 | 5/1991 | Catron et al. | 379/93 |
| 5,272,749 | 12/1993 | Masek | 379/355 |

*Primary Examiner*—Ahmad F. Matar

[57] ABSTRACT

A method apparatus for specifying one of a plurality of special telephone numbers in such a way that different special telephone numbers can be specified for the same type of service according to the numbering plan of the area in which a call is being made. A dialing message from a telephone station contains a special number indicator for specifying a particular type of service, such as emergency, or traveler's information, and the indicator is translated in a service switching system into the local number for that service. Advantageously, a user of mobile telephone service, for example, need not learn the local numbers for these services.

10 Claims, 4 Drawing Sheets

GENERALIZING SPECIALIZED TELEPHONE NUMBERS

TECHNICAL FIELD

This invention relates to arrangements for dialing specialized telephone numbers.

PROBLEM

Specialized telephone numbers, such as emergency numbers, are not uniform throughout the world. For example, while 9-1-1 is widely used throughout the United States as an emergency number, the equivalent number in the United Kingdom is 9-9-9. In Korea, there are three different emergency numbers depending on the kind of emergency. Thus, when a traveler, especially a traveler having wireless service, travels from one country to another, he or she is frequently confused as to the number which is to be dialed to obtain special services. This can be crucial in the case of emergency service and merely inconvenient in the case of other service.

A partial solution to this problem has been found for mobile telephone emergency service. The mobile telephone service station is programmed to mark an emergency flag in a dialing message from the mobile telephone station whenever the caller calls a number which has been preassigned as an emergency number in the caller's home territory. Thus, if a resident of the United States went to England and dialed 9-1-1, the emergency service marker would be sent to the mobile switch in England. This mobile switch would check the emergency flag and recognize that emergency service is needed.

A problem of the prior art is that this type of solution, while adequate for a single emergency number, lacks flexibility for other services such as a service that would help lost travelers find their way to a destination or a service that would help a traveler experiencing automobile trouble.

SOLUTION

The above problem is solved and an advance is made over the prior art in accordance with the teachings of applicant's invention wherein a dialing message from a telephone station such as a wireless terminal, includes, in addition to the digits dialed by the customer, a field, for example, a byte, for specifying one of a plurality of standardized telephone services. The telephone station has a record of the telephone numbers equivalent to these services in the home area of the customer who owns the telephone station. When a caller using such a telephone station dials one of the special numbers, such as special service numbers used in the owner's home area, the special field is marked with the corresponding indicator value identifying the service. When this dialing message is received by the originating switching system, this field is examined; if it is not zero, the type of service is identified and the switching system will route this call to the provider of this type of service. Examples of such services are restaurant information service, hospital information service, hotel information service, automobile repair information service or travelers advisory service. A portable memory or processor including a memory can be used to adapt a mobile telephone station, or any other telephone station that uses dialing messages to transmit dialing information to a switch, to implement applicant's invention. Advantageously, a caller need only remember the telephone numbers of the various types of service as they exist in his or her home location and be assured that the proper service is connected when this number is dialed in a different area.

In accordance with one embodiment of applicant's invention, the automatic specification of the service type is inhibited if the caller provides a special code or, alternatively, fails to provide such a code. Advantageously, such an arrangement prevents a misrouting of calls if the caller is already familiar with a particular telephone number or telephone numbering arrangement in the area being visited so that if, for example, a country visited by the caller provided repair service if a caller dials 9-1-1, and this caller wishes to reach repair service in that country, the caller is not falsely routed to emergency service.

In accordance with one embodiment of applicant's invention, a caller may also specify a special attribute for a call which special attribute is forwarded in an attribute indicator field of the dialing message. An example of such a special attribute is priority service, a service which can be provided with any call, and is therefore, independent of the telephone number; another example is a request to suppress the forwarding of the caller's identity to the called party.

In accordance with one aspect of applicant's preferred implementation, the key pad of the telephone instrument is used for specifying the telephone numbers and the corresponding special indicator values for each of the special services that are of interest to the caller.

In accordance with one feature of applicant's invention, a translation from an abbreviated dialing code to a telephone number precedes the translation to determine whether a special number indicator is to be inserted into the dialing message. Advantageously, this permits callers to use abbreviated numbers (numbers which are sometimes specified by the push of a single button) and still be able to specify a specialized type of call.

DETAILED DESCRIPTION

Figure 1:
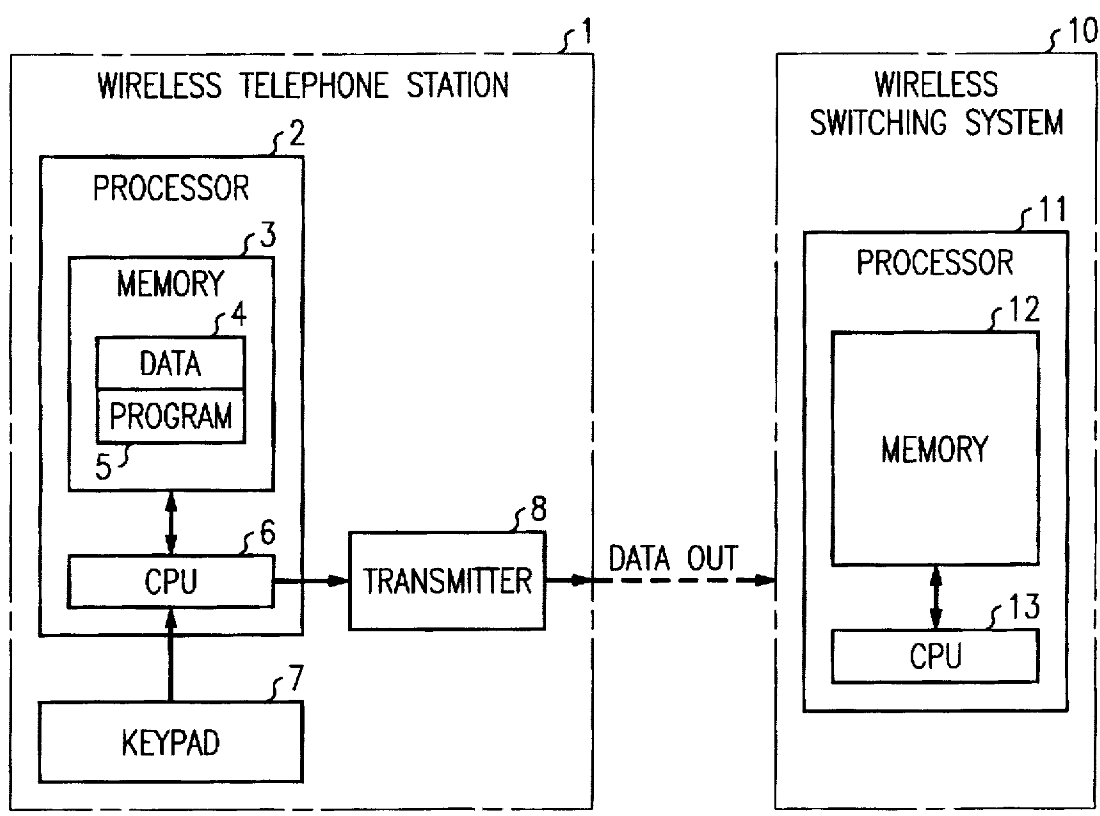
FIG. 1 is a block diagram illustrating the operation of a telephone station arranged for implementing applicant's invention.

FIG. 1 is a block diagram of a part of the telephone station used for implementing an illustrative embodiment applicant's invention. The telephone station 1 includes a processor 2 and a key pad 7. The processor includes memory 3 having portions for storing data 4 and a control program 5. The memory is accessed by a central processing unit 6 which receives inputs from a key pad 7, and generates a data message output for transmission by transmitter 8. The central processing unit is controlled by the program 5, stored in the memory 3, and operates on data stored in section 4 of memory 3. The key pad 7 can also include special buttons which are interpreted as the equivalent of a special attribute (such as priority) or a special number indicator (such as emergency). The dialing message is transmitted to a serving switching system 10, where it is routed to a processor 11 which has a central processing unit 13 and memory 12 for storing a control program and the correspondence between special numbers indicator values and the special numbers corresponding to these values in the area served by that switching system. The switching system can comprise a wireless switching center for serving wireless terminals, in which case the data message is transmitted by radio and relayed by a base station (not shown).

In one preferred embodiment of the invention, the processor described herein is mounted on a circuit card, such as a smart card, which is inserted into a telephone station. The translation information is stored in read only memory or programmable read only memory on that card. The card can be taken by a user and inserted into a wireless telephone station when the user travels, including travels abroad. Eventually, such facilities may also be offered for land-based telephones, especially ISDN (integrated services digital network) telephones which transmit a dialing data message to a connected switching system.

Figure 2:
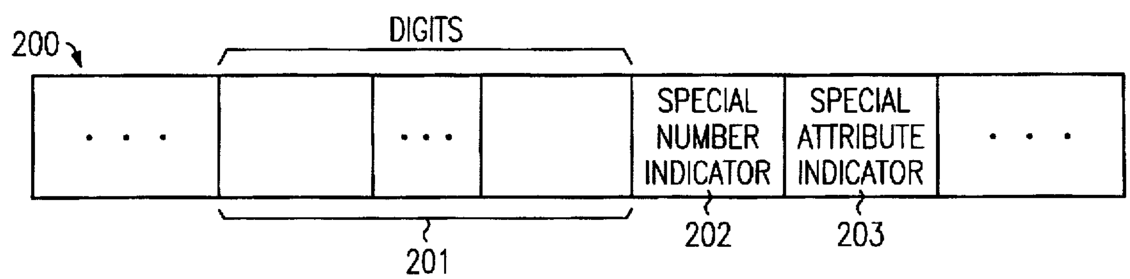
FIG. 2 is a message layout of a dialing message used for implementing applicant's invention.

FIG. 2 is a data layout of a dialing message 200. The message includes the dialed digits (block 201) a special number indicator 202, and a special attribute indicator 203. The value of the special number indicator, if not zero, indicates the type of service being requested. If special number indicator 202 is not zero, then digits 201 are ignored and the switching system serving the call establishes connections to the specialized service indicated by special number indicator 202. If special attribute indicator 203 is not zero, then the treatment of the call is modified in accordance with the requirements of the special attribute specified in the special attribute indicator of the dialing message for the call.

Figure 3:
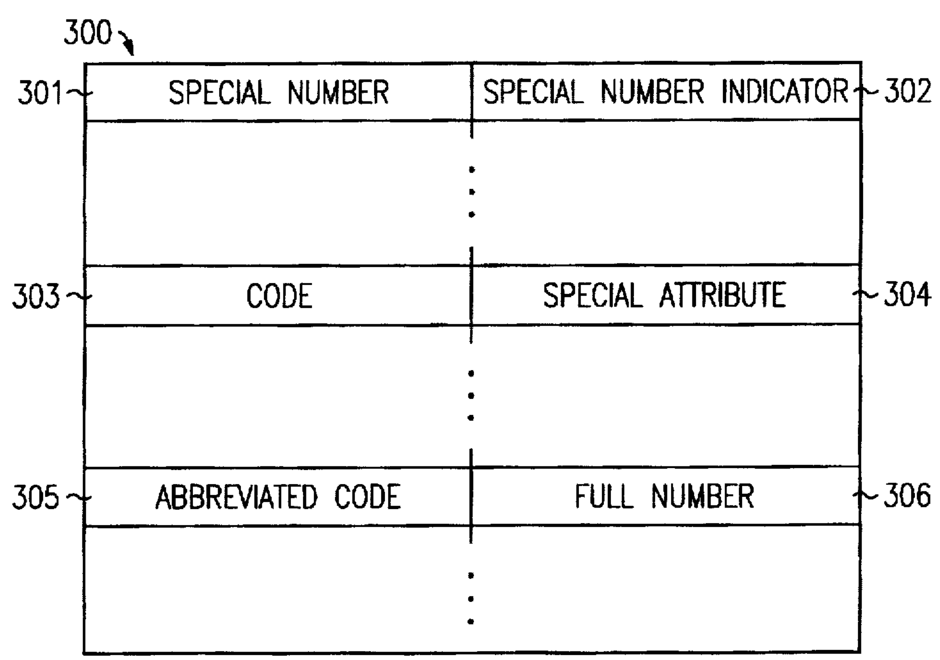
FIG. 3 is a data layout of data stored in the memory of a telephone station used for implementing applicant's invention.

FIG. 3 is a data layout of data stored in the memory of the telephone station 1. Entries 301 and 302 specify a special service number as dialed by a caller in the home area of that caller and the corresponding special number indicator 302. For example in the United States, 9-1-1 would correspond to special number 1. A full seven or ten digit number might correspond to special number 4 if that seven or ten digit number was used to reach a service for helping travelers find theft way. It is of course necessary for standards to be accepted in any area in which this invention would be implemented so that the specialized number one would correspond to the same type of service in any such area. Data corresponding to entries 301 and 302 are stored in the switching system 10 so that the reverse translation can be made, the reverse translation being in conformance with the dialing and numbering plan of the area served by the switching system.

The data 300 also includes a series of entries 303 specifying a code required for requesting a special attribute and 304 for the special attribute number corresponding to that code; special attribute numbers are standard in all areas in which applicant's invention is practiced.

Data area 300 also includes the plurality of entries 305 prescribing an abbreviated dialing code and 306 providing the full number corresponding to that abbreviated dialing code. The entry 305 and 306 are available in the prior art. They are shown here to emphasize that it is necessary for the program of the telephone station to translate from an abbreviated dialing code to a full number before generating the dialing message and before making the decision as to whether the dialing message includes a special number indicator.

Figure 4:
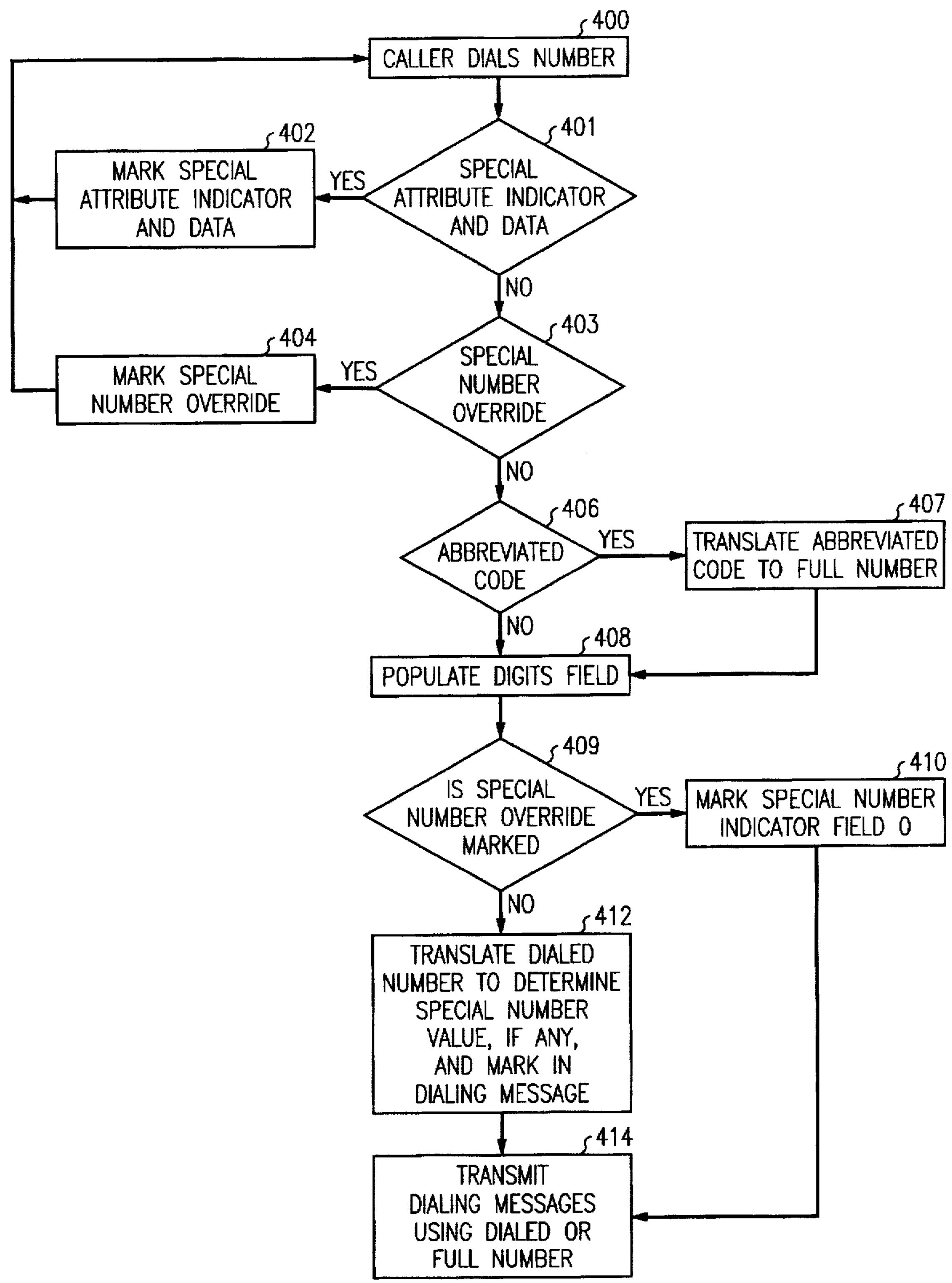
FIG. 4 is a flow diagram of actions performed by the telephone station in order to generate a dialing message.

FIG. 4 is a flow diagram of a program executed by the processor in the telephone station. The caller dials a number or code (action block 400). If the caller wishes to attach a special attribute (such as priority to the call or a request to suppress the identity of the caller to the called party) to the call, the caller will first dial a special attribute code (such as #) followed by a three digit attribute identifier. Test 401 checks for this indicator and, if found, marks the special attribute data in the dialing message (action block 402) and block 400 is reentered. Thereafter test 403 determines if this is a special service number override code, such as *. If so then the special service number override is marked so that no special service number indicator will be sent in the dialing message (action block 404) and block 400 is reentered. Thereafter the caller will dial a telephone number (action block 400). If the dialed number is not a special number override, then test 406 is used to determine if the dialed number is an abbreviated code. If so, then this abbreviated code is translated to a full number (action block 407). The full number is then used to populate the digits field of the dialing message (action block 408). Next, test 409 is used to determine whether the caller has overridden special service number treatment. If the caller has overridden special number treatment, then the special number field is blanked in the dialing message (action block 410). A dialing message is then sent using the dialed or full number (action block 414). If the caller has not overridden special service number treatment, then action block 412 is used to determine whether the dialed number is in the special service number table; if so, then the special service number indicator is marked with a value corresponding to the dialed or full number. Thereafter, the telephone station transmits the dialing message (action block 414), using the dialed number or full number as translated in action block 407.

Figure 5:
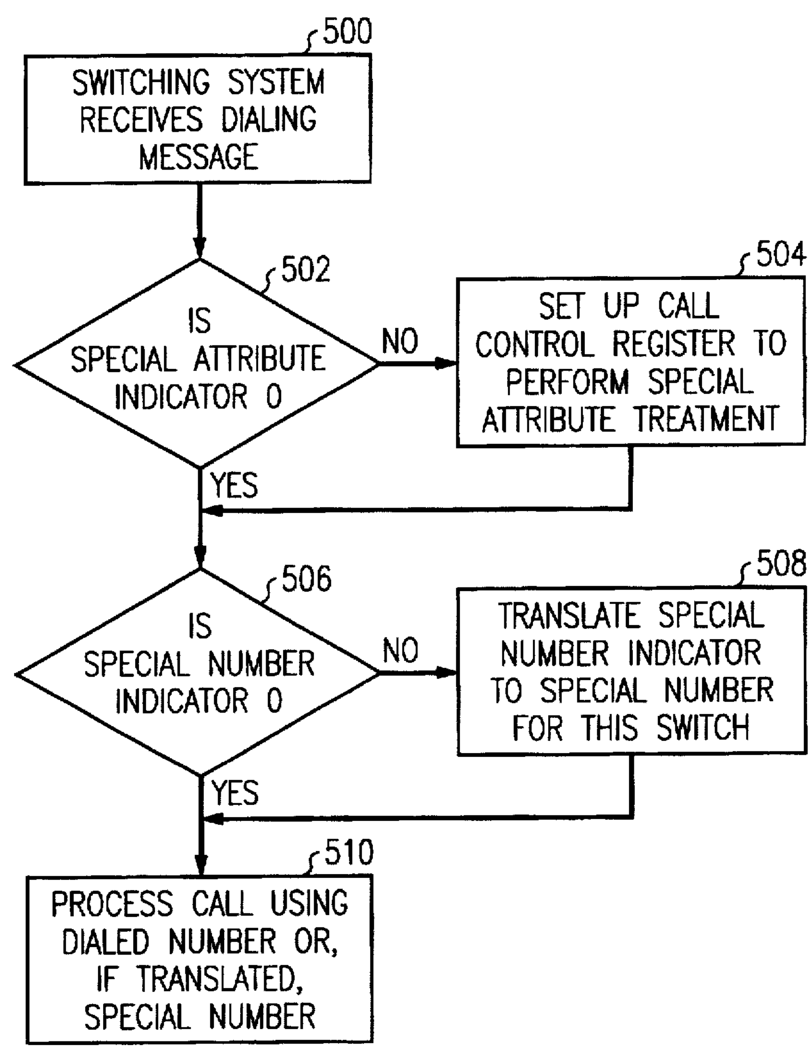
FIG. 5 is a flow diagram of operations performed in a switching system to interpret the dialing message.

FIG. 5 is a flow diagram of the actions performed by a switching system that receives the dialing message (action block 500). The switching system tests if the special attribute indicator in the dialing message is zero (test 502). If not, then the call control register for controlling this call is set up to perform the special attribute treatment on this call (action block 504). Next, a test is made to see if the special service number indicator is zero (test 506). If not, then the special service number indicator is translated to a special service number corresponding to that indicator in the switching system that receives the dialing message (action block 508). Finally, a call is processed using the dialed number or, if translated the special service number, and using any special attribute treatment that has been set up in the call control register (action block 510).

The method and apparatus of the invention will work in any telephone station, such as a wireless telephone station, equipped with a processor, which transmits a dialing message expandable to include the special data of the special attribute field and/or the special service number indicator, provided the serving switch has a program for accepting and processing such inbound dialing messages. Another example of such a station is an ISDN (integrated services digital network) telephone station.

I claim:

1. In a telephone station arranged to transmit a dialing message for an origination by a caller, a method of specifying a terminating telephone number comprising the steps of:

storing a table relating a plurality of special telephone numbers to a plurality of special number indicator values in said telephone station;

responsive to receiving a dialed number from a caller, testing whether said dialed number corresponds to one of a plurality of special telephone number stored in said table;

if said dialed number corresponds to one of said special telephone numbers marking a special number indicator of said dialing message with a special number indicator value corresponding to said dialed number; and transmitting a dialing message to a switching system, said dialing message comprising said special number indicator value for permitting said switching system to translate said special number indicator value for permitting said switching system to translate said special number indicator value to a telephone number corresponding to said special number indicator value in said switching system.

2. The method of claim 1 further comprising the step of:

responsive to receipt of a dialed number indicating that the special number indicator value is to be suppressed, transmitting a blank special number indicator value in said dialing message.

3. The method of claim 1 further comprising the steps of:

responsive to receiving a dialed number specifying one of a plurality of a special attributes for a call, transmitting in said dialing message a special attribute indicator, corresponding to the specified special attribute, for specifying to a connected switching system that said call is to be processed in accordance with the specified special attribute indicator.

4. In a switching system, a method of recognizing one of a plurality of special numbers in a dialing message from a calling station, comprising the steps of:

responsive to receipt of a dialing message comprising a special number indicator having a value that indicates a category of a call, wherein all calls for a category are served by one telephone number, that corresponds to a special number for said category of call stored in said switching system substituting said special number for the dialled number received in said dialing message; and establishing a call to said special number.

5. The method of claim 4 further comprising the steps of:

determining whether a special attribute value has been received in said dialing message; and responsive to determining that a special attribute value has been received, processing a call specified by said dialing message in accordance with a special attribute corresponding to said special attribute value.

6. In a telephone station arranged for transmitting a dialing message, apparatus for specifying a terminating telephone number comprising:

memory for storing a plurality of special telephone numbers;

means for transmitting said dialing message; and processor means for:

(1) testing whether a dialed number received in said telephone station from a caller, corresponds to one of the stored telephone numbers;

(2) if said dialed number corresponds to one of the said stored plurality of special telephone numbers, inserting a value corresponding to the stored telephone number into a special number indicator of said dialing message for transmission by said means for transmitting.

7. The apparatus of claim 6 to wherein said processor means is further responsive to receipt of dialed signals from a caller overriding special number treatment for suppressing the insertion of said special number indicator in said dialing message.

8. The apparatus of claim 6 wherein said processor means is further responsive to receipt of dialed signals from a caller requesting processing of a call in conformance with one of a plurality of special attributes, to insert in said dialing message a special attribute indicator, corresponding to the requested special attribute.

9. In switching system comprising processor means, apparatus for controlling routing of a call to one of a plurality of special telephone numbers, said processor means comprising;

receiver means for receiving a dialing message; and receiver means for receiving a dialing message; and processor means for interpreting said dialing messages;

said processor means comprising:

storage for storing a control program and a plurality of special telephone numbers each corresponding to one a plurality of special number indicator values each special number indicator for one of a plurality of categories of a call, wherein a common telephone number serves all calls of one category; and a central processing unit for processing instructions specified by said program;

(1) determining whether said dialing message has a special number indicator having a value that indicates a category of a call that corresponds to one of the stored plurality of special telephone numbers for said category of call; and (2) responsive to determining that said special number indicator corresponds to one of the stored plurality of special telephone numbers, controlling establishment of a call to the corresponding stored special telephone number.

10. The apparatus of claim 9 wherein said processor means is further operative under the control of said program for determining whether a special attribute indicator has been received in said dialing message and responsive to determining that a special attribute indicator has been received, processing the call specified by the said dialing message in accordance with said special attribute indicator.

* * * * *